United States Patent Office 3,410,810
Patented Nov. 12, 1968

3,410,810
POLYMERS OF CYANOALKYL EPOXY ETHERS
Harold A. Tucker, Shaker Heights, Ohio, assignor to The B. F. Goodrich Company, New York, N.Y., a corporation of New York
No Drawing. Filed May 3, 1966, Ser. No. 547,166
15 Claims. (Cl. 260—2)

ABSTRACT OF THE DISCLOSURE

Cyanoalkyl epoxy ethers are homopolymerized and interpolymerized with other epoxide comonomers to provide polymers having a polyether backbone and nitrile groups pendant to the polymer chain. The terpolymers produced by the interpolymerization of cyanoalkyl glycidyl ethers with an alkylene oxide and an ethylenically unsaturated epoxy compound are sulfur curable and provide useful rubbers having a good balance of flexibility at low temperatures, aging resistance and resistance to swell in aromatic oils and water.

This invention relates to polymers of cyanoalkyl epoxy ethers.

In accordance with this invention, new and useful polyether homopolymers and interpolymers are prepared from cyanoalkyl epoxy ethers represented by the general formula:

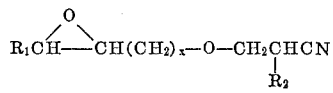

wherein $R_1$ is hydrogen, a lower alkyl group having from 1 to 4 carbon atoms or phenyl, $R_2$ is a hydrogen, methyl or ethyl group and $x$ is a number from 1 to 7; more preferably to provide the novel and improved polyethers $R_1$ and $R_2$ are hydrogen or methyl and $x$ is a number from 1 to 3. Cyanoethyl glycidyl ether has been found particularly useful in preparing such polymers.

The polymers of this invention contain a nitrile group pendant to the polyether backbone, that is, they contain repeating structural units of the formula

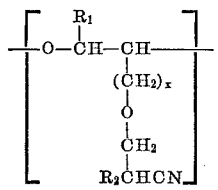

wherein $R_1$ is hydrogen, a lower alkyl containing from 1 to 4 carbon atoms or phenyl, $R_2$ is a hydrogen, methyl or ethyl group and $x$ is a number from 1 to 7.

The cyanoalkyl epoxy ethers can be homopolymerized or they can be copolymerized with one or more other epoxy compounds. Examples of epoxy compounds which can be interpolymerized with the cyanoalkyl epoxy ethers to provide polymers having improved resistance to oils and water include alkylene oxides, epoxides of dienes and polyenes, substituted alkylene oxides, aralkylene epoxides, saturated glycidyl ethers, unsaturated glycidyl ethers, glycidyl esters and the like.

Cyanoalkyl epoxy ethers are readily homopolymerized to give high molecular weight elastomeric polymers. The polymerization occurs through the epoxy group to produce linear polyethers wherein the groups pendant to the polymer backbone contain the highly polar nitrile function. The poly(cyanoethyl glycidyl ether) is insoluble in acetone, dimethyl formamide, dimethyl sulfoxide and chlorobenzene at room temperature and dimethyl acetamide at 100° C.

The cyanoalkyl epoxy ethers can be interpolymerized with other copolymerizable epoxide monomers. Such copolymerizable monomers include: alkylene oxides having the formula

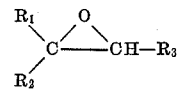

wherein $R_1$, $R_2$ and $R_3$ are hydrogen or an alkyl group containing from 1 to 6 carbon atoms, but at least one is hydrogen, such as ethylene oxide, propylene oxides, butene oxides, isobutylene oxides, hexene oxides and the like; monoexpoxides of aliphatic dienes and polyenes which contain one or two ethylenically unsaturated radicals containing 2 to 18 carbon atoms such as vinyl, isopropenyl, allyl, methallyl, butenyl, hexenyl, oleyl, etc., attached to the epoxy ring, for example, butadiene monoxide, 3,4-epoxy-1-pentene, 4,5-epoxy-1-hexene, 6,7-epoxy-1-octene, chloroprene monoxide and the like; substituted alkylene epoxides having the formula

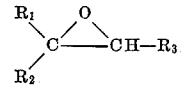

where $R_1$, $R_2$ and $R_3$ are radicals selected from the group consisting of hydrogen, alkyl containing from 1 to 6 carbon atoms and halogen or haloalkyl containing from 1 to 4 carbon atoms such as fluoro, chloro, bromo, chloromethyl, chloroethyl, chloropropyl, dichloromethyl, trichloromethyl, bromomethyl, fluoromethyl, difluoromethyl, trifluoromethyl, but at least one of said R groups being a halogen or haloalkyl radical, for example epichlorohydrin, epibromohydrin, vinyl chloride epoxide, methallyl chloride epoxide, dichloroisobutylene epoxide, 1-chloro-3,4-epoxybutane, trichloromethyl ethylene oxide, trifluoromethyl ethylene oxide and the like; aralkylene epoxides having the formula

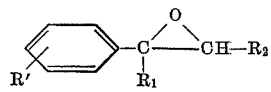

wherein $R_1$ and $R_2$ are hydrogen or an alkyl radical containing from 1 to 6 carbon atoms, but at least one is hydrogen, and $R'$ is chloro, bromo or an alkyl group containing from 1 to 8 carbon atoms, such as styrene oxide, alpha-methyl-styrene oxide, divinyl benzene monoxide, etc.; saturated glycidyl ethers of the formula

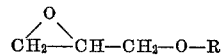

where R is an alkyl or haloalkyl radical containing from 1 to 10 carbon atoms, such as methyl glycidyl ether, ethyl glycidyl ether, isopropyl glycidyl ether, t-butyl glycidyl ether, n-hexyl glycidyl ether, n-octyl glycidyl ether, chloroethyl glycidyl ether and the like; unsaturated glycidyl ethers having the formula

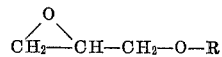

wherein R is a phenyl or substituted phenyl radical containing 7 to 10 carbon atoms or an ethylenically unsaturated radical containing 2 to 18 carbon atoms such as vinyl, isopropenyl, allyl, methallyl, butenyl, hexenyl, oleyl, etc., for example, vinyl glycidyl ether, allyl glycidyl ether, methallyl glycidyl ether, isopropenyl glycidyl ether, butenyl glycidyl ether, hexenyl glycidyl ether, oleyl glycidyl ether, vinyl cyclohexyl glycidyl ether, phenyl glycidyl ether, chlorophenyl glycidyl ether, tolyl glycidyl ether, o-allylphenyl glycidyl ether, etc.; glycidyl esters of the formula

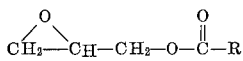

wherein R is an alkyl, aryl or ethylenically unsaturated radical containing 1 to 20 carbon atoms, such as glycidyl acetate, glycidyl propionate, glycidyl butyrate, glycidyl benzoate, glycidyl acrylate, glycidyl methacrylate, glycidyl crotonate, glycidyl oleate and the like; and others.

The polymers may be prepared with the cyanoalkyl epoxy ethers alone or with one or more other copolymerizable epoxide monomers. Interpolymers containing from about 1% to about 99% by weight cyanoalkyl epoxy ether and from about 99% to about 1% by weight other copolymerizable epoxide monomer(s) provide useful materials. Especially useful are interpolymers containing cyanoalkyl epoxy ethers in amounts greater than about 10% by weight.

The polymers of this invention process readily and require no special handling or processing equipment. They may be compounded on rubber mills or in Banbury mixers and may be extruded. They may be mixed or blended with other polymers or polymer blends, with fillers, reinforcing agents, stabilizers, antioxidants, sulfur and other curing agents, accelerators, plasticizers, lubricants, anti-sticking agents and the like.

Copolymers of cyanoalkyl epoxy ethers and one other copolymerizable monomer can be prepared. Particularly useful are cyanoethyl glycidyl ether-alkylene oxide copolymers which have improved resistance to aromatic oils and water and vulcanizable copolymers of cyanoethyl glycidyl ether and about 1% to about 20% by weight of a copolymerizable epoxide monomer containing ethylenic unsaturation.

Certain terpolymers are particularly useful as rubbers which are sulfur curable and have a good balance of flexibility at extremely low temperatures, aging characteristics, and resistance to swell in aromatic oils and water. These terpolymers include those which contain an alkylene oxide in amounts generally greater than 40% by weight, about 10% to about 40% by weight cyanoalkyl epoxy ether and about 3% to about 20% by weight of a polymerizable ethylenically unsaturated epoxy monomer, capable of introducing sulfur cure sites (unsaturation) into the polymer. An especially useful elastomer for this purpose is a terpolymer of propylene oxide, cyanoethyl glycidyl ether and allyl glycidyl ether. This terpolymer has proved comparable in physical properties to the commercial ethylene oxide-epichlorohydrin copolymers with the added features the terpolymers are sulfur curable and contain no halogen. The absence of halogen is especially attractive since the polymer is more stable and no halogen is present to split from the polymer chain as HX and attack metals, etc.

The homopolymer and interpolymers of this invention may be prepared by reacting the cyanoalkyl epoxy ether or the cyanoalkyl epoxy ether and other copolymerizable epoxide monomers, preferably in the presence of an inert liquid diluent or solvent, with a catalyst.

It is generally preferred for the preparation of the homopolymers and interpolymers that the polymerization be carried out in solution, however, a bulk polymerization process may be used. Suitable inert diluents and solvents which may be used for the solution polymerization include benzene, toluene, chlorobenzene, n-heptane, cyclohexane, methyl chloride, chloroform, carbon tetrachloride, ethylene dichloride, diethyl ether, dibutyl ether and the like. Aromatic and aliphatic hydrocarbons containing 6 to 10 carbon atoms are especially useful solvents for the polymerization. The polymerization may be conducted as either a batch or continuous process.

The polymerization process employed may be carried out over a wide range of temperatures and pressures. Polymerization temperatures can range from about −50° C. to about 150° C., however, from about −10° C. to about 100° C. is more preferred. Generally, the polymerization will be conducted at moderate pressures ranging from about atmospheric to about 100 p.s.i.g. It is possible, however, to vary the pressure from sub-atmospheric to 10 or more atmospheres. The time required for the polymerization will vary with the temperature and pressure. Suitable conversions are usually achieved in less than 24 hours.

A catalyst is preferred to effect the polymerization of cyanoalkyl epoxy ethers. Any of the conventional epoxide-polymerizing catalysts such as Lewis acids, tertiary amines, etc., which are well known to the art, may be used. Organoaluminum catalysts similar to those described in U.S. Patent 3,219,591 are useful catalysts and are generally employed. These catalysts are prepared by adding an ether to a toluene or heptane solution of an organoaluminum compound maintained at about 0° C. and then adding water and a chelating agent. Suitable organoaluminum compounds include triethylaluminum, triisobutylaluminum, diisobutylaluminum hydride, diethylaluminum chloride, etc. The chelating agent may include acetylacetone, acetonylacetone, benzoylacetone, acetoacetic acid, ethyl acetoacetate, etc. Preferably, the molar ratios of water to organoaluminum compound and chelating agent will both be in the range from about 0.2:1 to about 1:1. An especially preferred catalyst for the cyanoalkyl epoxy ethers is triethylaluminum/water/acetylacetone prepared with tetrahydrofuran as the ether and in a mol ratio 1.0/0.5/0.5 for the triethylaluminum, water and acetylacetone respectively. The amount of catalyst required to polymerize the cyanoalkyl epoxy ethers will vary within the range from about 0.1 to about 20 mol percent based on the monomers depending on the monomer purity, monomer reactivity, etc. Preferably, the catalyst will range from about 0.5 to about 7 mol percent based on the monomers. Generally, the catalyst is prepared prior to the polymerization, however, it may be advantageous in some cases to prepare the catalyst in situ. If the catalyst is prepared in advance, it may be used immediately or it may be aged. Addition of the catalyst to the polymerization reaction may be in one portion, incremental or continuous.

It is not necessary that the monomers and solvent be absolutely pure, however, a reasonable purity will insure a smooth polymerization. Oxygen, carbon dioxide, alcohols, water and the like which tend to decrease the catalyst activity should be eliminated or present in only small amounts. Good results have been obtained with reactants and solvents that have been distilled and/or passed through a molecular sieve prior to use in polymerizations carried out under a nitrogen atmosphere.

The following examples serve to illustrate the invention more fully, however, they are not intended to limit the scope thereof. All parts and percentages are by weight unless otherwise indicated. Percent conversions are based on the total monomers charged and were determined by measuring the total solids of the polymerization cements and correcting for catalyst residue. Reduced Specific Viscosities, abbreviated RSV and defined as $\eta_{sp}/C$, are reported for solutions containing 0.1 g. polymer per 100 ml. solution. Nitrogen analyses are corrected for beta-naphthylamine stabilizer added.

Example I

Cyanoethyl glycidyl ether was prepared by charging 222 g. (2 mols) of cyanoethyl allyl ether, 100 ml. of methanol and 310 g. (3 mols) of benzonitrile to a reactor equipped with a stirrer, a thermometer, a reflux condenser, two dropping funnels and a glass calomel electrode pair. One dropping funnel contained 143.5 g. (2.1 mols) of 50% hydrogen peroxide while the other was filled with 1 N sodium hydroxide. The reaction mixture was heated to about 40° C. and the meter pH adjusted to a nominal reading of 10 by adding sodium hydroxide to the reaction mixture. The heating was discontinued and hydrogen peroxide added dropwise at such a rate that the reaction temperature did not rise above about 50° C. During the hydrogen peroxide addition the meter pH of the reaction mixture was maintained at about 9.4 to 10 (actual pH about 7.5 to 8.5) by adding sodium hydroxide. When the hydrogen peroxide addition was complete the reaction mixture was heated 4 hours at about 45° C. while maintaining the proper pH. A total of 72 ml. 1 N sodium hydroxide was added throughout the entire run. The reaction mixture was cooled to room temperature and 400 ml. chloroform and 1500 ml. water added. The aqueous layer was separated and washed with several portions of chloroform. The combined chloroform extracts were dried over anhydrous sodium sulfate and the benzamide which crystallized upon standing removed by filtration. The filtrate was fractionated through a Vigreaux column, the product being collected at 110–130° C./2 mm. Hg. The resulting mobile liquid (111 g.; 44% yield) was redistilled, B.P. 85° C./0.3 mm. Hg. $N_D^{25}$ 1.4415. The product was analyzed and found to contain 11.60% epoxy oxygen and 10.84% nitrogen; theoretical for cyanoethyl glycidal ether is 12.60% epoxy and 11.92% nitrogen.

Example II

This example demonstrates the homopolymerization of cyanoethylglycidyl ether. The catalyst solution used was prepared by diluting 34.1 g. (0.29 mol) triethylaluminum with 200 ml. sieve-dried toluene. The solution was cooled and maintained at 0° C. and 384 ml. (3.6 mols) diethyl ether added. The solution was stirred and 2.7 ml. (0.15 mol) water added over about 35 minutes at a temperature of 0° C. Acetylacetone (15 ml.; 0.14 mol) was then added and stirred at 0° C. for about 15 minutes. The catalyst solution was allowed to warm to room temperature overnight. Analysis indicated the catalyst solution contained 13.2 mg. Al/ml.

A polymerization tube was charged at room temperature under nitrogen with 12 ml. of sieve-dried toluene and 2.4 g. cyanoethyl glycidyl ether. Catalyst (1.5 ml.) was then charged and the tube tumbled in a 50° C. water bath. After 2 hours another 1.5 ml. of catalyst solution was added and the polymerization allowed to run 19 hours at 50° C. The polymerization was short-stopped with 1 ml. of a solution containing 200 ml. propanol, 100 ml. toluene and 20 g. phenyl-beta-naphthylamine. The liquid was decanted and the polymer washed with heptane and dried. A 17% yield, of a soft amorphous rubbery solid was obtained.

Example III

Cyanoethyl glycidyl ether and propylene oxide were copolymerized with a catalyst prepared as described in Example II except tetrahydrofuran was used in place of diethyl ether. Analysis showed the solution contained 12.52 mg. Al/ml. A 12 oz. polymerization bottle was charged at room temperature under nitrogen with 85.9 g. toluene (sieve-dried), 12.1 g. sieved propylene oxide, 3 g. cyanoethyl glycidyl ether and 10 ml. of the catalyst solution. The polymerization mixture was heated with tumbling in a 50° C. bath. Conversion sampling after 25, 55 and 135 minutes in the bath indicated 11.6, 19.0 and 23.4% monomer conversion. The polymerization was quenched after 19 hours and 8.0 g. of a soft rubbery polymer obtained after precipitation with aqueous methanol. The copolymer had an RSV in toluene of 12.0 with 14% gel, contained 1.55% ash and 2.35% nitrogen. When the above example is repeated and cyanoethyl 2,3-epoxybutyl ether substituted for the cyanoethyl glycidyl ether, the polymerization proceeds smoothly and a good yield of rubbery copolymer is obtained.

Examples IV–VIII

In each of the Examples IV–VIII cyanoethyl glycidyl ether was terpolymerized with propylene oxide and allyl glycidyl ether as follows: Five polymerization vessels were each charged at room temperature under a nitrogen atmosphere with 180 parts of sieved toluene and cyanoethyl glycidyl ether, sieved propylene oxide and sieved allyl glycidyl ether in amounts as shown in Table I. The catalyst solution (62 parts) was then injected and the polymerization vessels placed in a 50° C. bath and tumbled. The catalyst solutions used were all prepared as described in Example II except the ether used was tetrahydrofuran. The molar ratio of the catalyst components (triethylaluminum/water/acetylacetone) was 1.0/0.5/0.5. Set forth in Table I are the experimental details for the five polymerizations; the amount of monomers charged, the charge composition (percent by weight) of the monomers, the percent monomer conversion at given time intervals, the reaction time and the percent yield of polymer. The polymerizations were short-stopped with about 30 parts of phenyl-beta-naphthylamine solution described in Example II. The terpolymers produced in Examples IV, V and VI were isolated by evaporating enough of the volatile solvent to reduce the volume by about 25 to 50% and then precipitating. The terpolymer produced in Examples IV and V were precipitated with about 60 part portions of aqueous methanol while about 250 parts of heptane was used for precipitation in Example VI. The terpolymers of Examples VII and VIII were precipitated by adding about 1000 parts ligroin to the polymerization cement. Non-taky snappy rubbers were obtained after the terpolymers were dried in a vacuum oven at about 40° C. The terpolymers are more fully described in Table II.

TABLE I

| Example | IV | V | VI | VII | VIII |
|---|---|---|---|---|---|
| Cyanoethyl glycidyl ether (parts) | 7.9 | 8.2 | 16.0 | 20.0 | 24.0 |
| Propylene oxide (parts) | 68 | 60 | 60 | 52.0 | 48.0 |
| Allyl glycidyl ether (parts) | 3.8 | 8.1 | 4.0 | 8.0 | 8.0 |
| Charge composition (weight percent) | 10/85/5 | 10/80/10 | 20/75/5 | 25/65/10 | 30/60/10 |
| Percent Monomer conversion | 21 at 15'; 29 at 35'; 39 at 45' | 26 at 30'; 30 at 40'; 52 at 50' | 28 at 60' | 19 at 15'; 23 at 30' | 14 at 10' |
| Reaction time (hours) | 20 | 20 | 17 | 40 | 40 |
| Percent Polymer yield | 93 | 93 | 75 | 80 | 77 |

TABLE II

| Example | IV | V | VI | VII | VIII |
|---|---|---|---|---|---|
| Polymer Composition (weight percent) (propylene oxide/cyanoethyl glycidyl ether/allyl glycidyl ether) | 81/13/6 | 72/13/15 | 65/28/7.4 | 52/35/13 | 53/36/11 |
| RSV (in benzene) | 7.0 | 5.3 | 6.1 | 4.4 | 7.2 |
| Percent Gel | 17 | 40 | 30 | 58 | 0 |
| Bromine number | 8.6 | 21.0 | 10.4 | 18.0 | 14.3 |
| Percent Ash | 1.93 | 2.13 | 2.94 | 1.90 | 1.81 |
| Percent N | 1.30 | 1.31 | 2.87 | 3.60 | 3.61 |
| Percent PBNA | 1.2 | 3.0 | 2.8 | 3.2 | .1 |

The cyanoethyl glycidyl ether-propylene oxide-allyl glycidyl ether terpolymers from Examples IV, V, VI, VII and VIII were compounded on a rubber mill as follows:

Parts by weight
Terpolymer _____ 100
HAF carbon black _____ 40

| | |
|---|---|
| Zinc oxide | 5 |
| Stearic acid | 2 |
| 2,2'-dithiobis(benzothiazole) | 1 |
| Tetramethyl thiuram monosulfide | 2 |
| Sulfur | 2 |

The compounds were cured for 30 minutes at 284° F. between Teflon-coated aluminum and allowed to cool in the mold. Physical test data for the sulfur vulcanized terpolymers are set forth in Table III. The vulcanizates were air-aged at 212° F. for 4 days, aged in water for 2 days at 212° F. and aged in ASTM #3 oil at 212° F. for two days. These data are presented in Table IV.

TABLE III

| Example | IV | V | VI | VII | VIII |
|---|---|---|---|---|---|
| Tensile strength (p.s.i.g.) | 1,900 | 1,330 | 1,400 | 1,525 | 1,700 |
| Modulus (p.s.i.g.): | | | | | |
| 100% | 450 | 700 | 110 | 675 | 200 |
| 300% | 1,550 | | 400 | | 745 |
| Elongation (percent) | 400 | 180 | 975 | 215 | 725 |
| Hardness (Durometer A) | 66 | 70 | 50 | 67 | 52 |
| Compression Set (percent), 22 hours at 212° F | 78.9 | 73.0 | 103 | 78.1 | 92.3 |
| Gehman Freeze Pt. (° C.) | −56 | −52.5 | −51 | −42 | −45.5 |

TABLE IV

| Examples | IV | V | VI | VII | VIII |
|---|---|---|---|---|---|
| Air-aging (4 days at 212° F.): | | | | | |
| 100% Modulus | | | 260 | 1,125 | 340 |
| 300% Modulus | | | 890 | | 1,210 |
| Ultimate properties [1] | | | 1,610/600/61 | 1,700/170/75 | 1,760/460/60 |
| Water-aging (2 days at 212° F.): | | | | | |
| 100% Modulus | 600 | 840 | 200 | 690 | 360 |
| 300% Modulus | | | 700 | | 1,400 |
| Ultimate properties [1] | 1,575/255/65 | 1,130/150/70 | 1,320/495/53 | 1,410/175/63 | 1,625/350/56 |
| Percent Volume Swell | 1.6 | 1.0 | 2.4 | 0.76 | 1.1 |
| ASTM #3 oil-aging (2 days at 212° F.): | | | | | |
| 100% Modulus | 390 | 750 | 100 | 670 | 210 |
| 300% Modulus | | | 450 | | 1,000 |
| Ultimate properties [1] | 900/190/44 | 925/130/52 | 910/570/34 | 1,290/180/58 | 1,490/455/44 |
| Percent Volume Swell | 56.5 | 42.6 | 33 | 16.7 | 18.1 |

[1] Tensile strength (p.s.i.g.)/Elongation (Percent)/Durometer A Hardness.

Similarly, sulfur curable copolymers having good physical properties are obtained when Example IV is repeated with 2-cyanopropyl glycidyl ether, propylene oxide and allyl glycidyl ether and Example VIII is repeated with cyanoethyl glycidyl ether, ethylene oxide and allyl glycidyl ether.

Tables III and IV demonstrate the cyanoethyl glycidyl ether—propylene oxide—allyl glycidyl ether terpolymers are readily vulcanized with sulfur to produce tightly cured vulcanizates having a good balance of flexibility at extremely low temperatures, resistance to aging and resistance to swell in aromatic oils and water.

The terpolymers can be compounded by conventional processing techniques in a Banbury mixer or on a rubber mill and give smooth extrudates. Processing aids such as lubricants, plasticizers and anti-sticking agents, fillers, reinforcing agents, sulfur and other curing agents, accelerators, stabilizers, anti-oxidants and the like are readily mixed into the terpolymers and require no special processing. Also, the polymers can be mixed or blended with other amorphous or crystalline polymers to modify the polymer properties.

Polymers of the cyanoalkyl epoxy ethers provide an excellent combination of properties which make them useful for a wide variety of applications, particularly where resistance to oils and water is essential. Such applications include seals, belting, hose, coating and insulation for wires and cables and other automotive goods, adhesives, etc.

I claim:

1. A polymer of a cyanoalkyl epoxy ether, having the formula

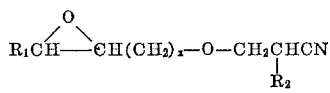

wherein $R_1$ is hydrogen, a lower alkyl group having from 1 to 4 carbon atoms or phenyl, $R_2$ is a hydrogen, methyl or ethyl group and $x$ is a number from 1 to 7, and containing structural units of the formula

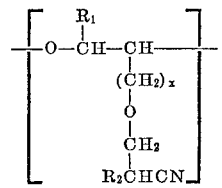

wherein $R_1$ is hydrogen, a lower alkyl group having from 1 to 4 carbon atoms or phenyl, $R_2$ is a hydrogen, methyl or ethyl group and $x$ is a number from 1 to 7.

2. A polymer of claim 1, wherein $R_1$ is methyl, $R_2$ is hydrogen and $x$ is 1, and the cyanoalkyl epoxy ether is cyanoethyl 2,3-epoxybutyl ether.

3. A polymer of claim 1, wherein $R_1$ is hydrogen, $R_2$ is methyl and $x$ is 1, and the cyanoalkyl epoxy ether is 2-cyanopropyl glycidyl ether.

4. A polymer of claim 1, wherein $R_1$ and $R_2$ are hydrogen and $x$ is 1, and the cyanoalkyl epoxy ether is cyanoethyl glycidyl ether.

5. A copolymer comprising the cyanoalkyl epoxy ether of claim 1 and at least one other copolymerizable epoxy compound selected from the group consisting of an alkylene oxide having the formula

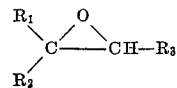

wherein $R_1$, $R_2$ and $R_3$ are hydrogen, halogen and alkyl groups containing from 1 to 6 carbon atoms or a haloalkyl group containing from 1 to 4 carbon atoms, but at least one is hydrogen, a monoepoxide of a diene or polyene, an aralkylene monoepoxide, a monoglycidyl ether and glycidyl ester of a monocarboxylic acid in amounts from about 1% to about 99% by weight of cyanoalkyl epoxy ether and from about 99% to about 1% other copolymerizable epoxy compounds.

6. A polymer of claim 5, wherein the cyanoalkyl epoxy ether is present in amounts greater than about 10% by weight.

7. A polymer of claim 6, which contains about 1% to about 20% by weight of an ethylenically unsaturated epoxy compound having the formula

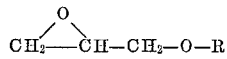

or

wherein R is an ethylenically unsaturated hydrocarbon radical containing from 2 to 18 carbon atoms.

8. A polymer of claim 7 wherein the ethylenically unsaturated epoxy compound is allyl glycidyl ether.

9. A polymer of claim 7 which contains from about

10% to about 40% by weight cyanoalkyl epoxy ether, from about 3% to about 20% by weight of an ethylenically unsaturated epoxy compound and more than about 40% by weight alkylene oxide.

10. A polymer of claim 9 wherein the alkylene oxide contains from 2 to 4 carbon atoms.

11. A polymer of claim 10 wherein the cyanoalkyl apoxy ether is cyanoethyl glycidyl ether, cyanoethyl 2,3-epoxybutyl ether or 2-canopropyl glycidyl ether.

12. A polymer of claim 10 wherein the ethylenically unsaturated epoxy compound is vinyl glycidyl ether, allyl glycidyl ether, methallyl glycidyl ether, isopropenyl glycidyl ether or butenyl glycidyl ether.

13. A polymer of claim 9 wherein the cyanoalkyl epoxy ether is cyanoethyl glycidyl ether, the ethylenically unsaturated epoxy compound is allyl glycidyl ether and the alkylene oxide is propylene oxide.

14. The process for preparing cyanoalkyl epoxy ether polymers which comprises polymerizing at about $-50$ to about 150° C. the epoxy ether in the presence of about 0.5 to 7 mol percent based on the total monomers of a trialkyl aluminum or alkyl aluminum halide catalyst.

15. The process of claim 14, wherein the polymerization is conducted in an inert organic diluent or solvent.

No references cited.

WILLIAM H. SHORT, *Primary Examiner.*

T. E. PERTILLA, *Assistant Examiner.*

UNITED STATES PATENT OFFICE
CERTIFICATE OF CORRECTION

Patent No. 3,410,810                                       November 12, 1968

Harold A. Tucker

It is certified that error appears in the above identified patent and that said Letters Patent are hereby corrected as shown below:

Column 5, line 23, after "epoxy" insert -- oxygen --. Column 6, TABLE II, sixth column, line 7 thereof, ".1" should read -- 3.1 --. Columns 7 and 8, TABLE IV, fifth column, line 6 thereof, "1,410/175/63" should read -- 1,410/185/63 --. Column 9, line 8, "apoxy" should read -- epoxy --; line 9, "canopropyl" should read -- cyanopropyl --.

Signed and sealed this 10th day of March 1970.

(SEAL)
Attest:

Edward M. Fletcher, Jr.                       WILLIAM E. SCHUYLER, JR.
Attesting Officer                                 Commissioner of Patents